United States Patent [19]

Hatano

[11] Patent Number: 4,541,743
[45] Date of Patent: Sep. 17, 1985

[54] PLASTIC RETAINER FOR ROLLER BEARING

[75] Inventor: Junichi Hatano, Yokohama, Japan

[73] Assignee: Nippon Seiko Kabushiki Kaisha, Tokyo, Japan

[21] Appl. No.: 643,022

[22] Filed: Aug. 20, 1984

[30] Foreign Application Priority Data

Aug. 26, 1983 [JP] Japan .............. 58-131148[U]

[51] Int. Cl.⁴ .......................................... F16C 33/46
[52] U.S. Cl. .................................... 384/576; 384/572
[58] Field of Search ............... 384/576, 572, 580, 575, 384/578

[56] References Cited

U.S. PATENT DOCUMENTS 3,314,737  4/1967  Ahlman ............................ 384/572
3,477,773  11/1969  Alton ................................ 384/576
4,288,129  9/1981  Ryanen ............................. 384/576
4,436,349  3/1984  Hallerbäck ....................... 384/572

Primary Examiner—Lenard A. Footland
Attorney, Agent, or Firm—Wyatt, Gerber & Shoup

[57] ABSTRACT

In a plastic retainer for roller bearing comprising first and second annular members disposed in axially spaced apart relationship, a plurality of posts containing the annular members and disposed circumferentially equidistantly, and a pocket for containing a roller formed between two adjacent posts and the annular members, the side surface of the post forming the pocket which is adjacent to the first annular member has a planar portion, the connecting portion between the planar portion and the first annular member provides a curved surface concave toward the pocket, and the radius of curvature of the curved surface is minimum on the pitch circle of the roller and is greater toward at least one side of the radial direction of the retainer.

7 Claims, 5 Drawing Figures

PLASTIC RETAINER FOR ROLLER BEARING

BACKGROUND OF THE INVENTION

1. Field of the Invention

This invention relates to a plastic retainer for roller bearing such as cylindrical roller bearing, conical roller bearing or spherical roller bearing.

2. Description of the Prior Art

A plastic retainer for roller bearing generally widely known, for example, a plastic retainer for cylindrical roller bearing as shown in FIGS. 1 and 2 of the accompanying drawings, comprises two concentric annular members 11a and 12a facing each other, a predetermined number of posts 13a disposed circumferentially equidistantly, and a pocket 14a for containing a roller 2 formed between adjacent posts and the planar portion 121a of the two annular members. In Figures, reference numeral 3 designates an outer race and reference numeral 4 denotes an inner race.

Generally, a plastic retainer is lighter in weight than a metallic retainer and has resilience and has been regarded as being higher in breaking strength under severe conditions involving vibration, shock, etc. than the metallic retainer, and also has been regarded as being different in the form of breaking from the metallic retainer.

However, according to the fatigue breaking test carried out by the inventors, it has been found that in the plastic retainer, as in the metallic retainer, concentrated stress occurs to the corner 15a of the connecting portion between the annular members 11a, 12a and the posts 13a and particularly, with the retainer outer peripheral portion or the retainer inner peripheral portion of the corner 15a as the starting point, the annular members are broken by crack being propagated toward the outer end surface of the annular member 12a as indicated by broken line B.

From this, it has been found that even in a plastic retainer, to avoid the concentration of stress and increase the strength, the shape of the corner 15a, particularly, the radius of curvature of the curved surface of the corner, is an important factor, but in the prior art, it has been necessary that the radius of curvature of the corner be set to a dimension which does not interfere with the chamfered portion of the roller contained in the pocket and therefore, it has been a very practical design to provide a uniform radius of curvature from the inner peripheral portion to the outer peripheral portion of the pocket.

Therefore, to improve the strength, the axial thickness and radial thickness of the annular members 11a and 12a have been increased, but such countermeasure is limited from the major dimensions (particularly, the width, inner diameter and outer diameter) of the bearing and in such a case, the roller dimensions are sometimes unavoidably made smaller and said thickness are increased, whereas this may give rise to a problem which may result in reduced load capacity of the bearing.

Thus, the conventional plastic retainer for roller bearing has been limited in the degree of freedom at the stage of designing.

The present invention has been made to solve the above-noted problems and an object thereof is to provide a plastic retainer for roller bearing which is high in breaking strength.

It is also an object of the present invention to provide a plastic retainer for roller bearing which is useful for the designing of a bearing of great load capacity and moreover is compact.

The invention will become fully apparent from the following detailed description thereof taken in conjunction with the accompanying drawings.

DESCRIPTION OF THE PREFERRED EMBODIMENTS

Some embodiments of the present invention will hereinafter be described by reference to the drawings.

Figure 1:
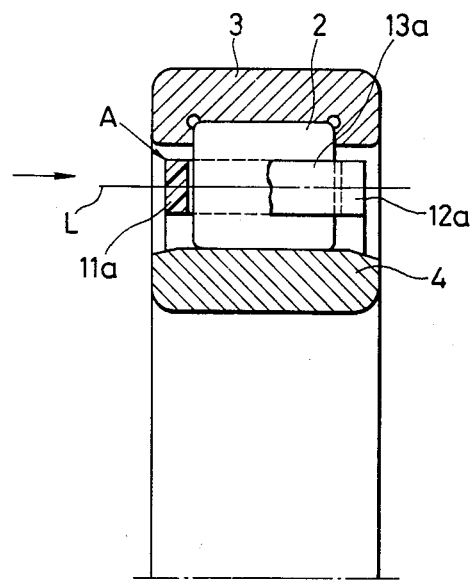
FIG. 1 is a partial longitudinal cross-sectional view of a plastic retainer for cylindrical roller bearing according to the prior art as incorporated into a cylindrical roller bearing.
Figure 2:
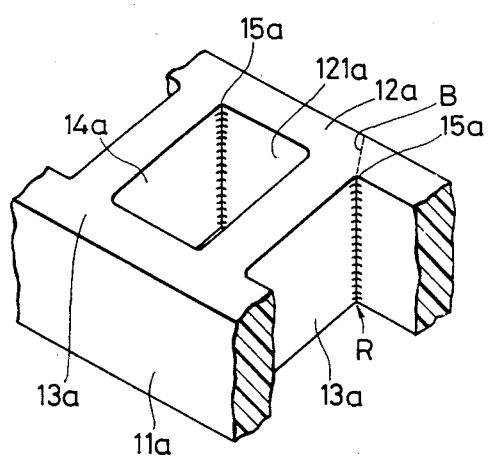
FIG. 2 is a perspective view showing a pocket in which a roller is contained.
Figure 3:
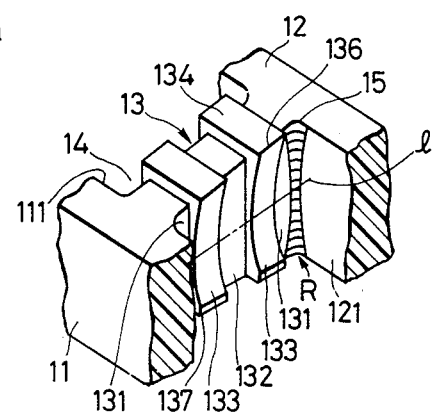
FIG. 3 is a view corresponding to FIG. 2 but showing an embodiment of the present invention.

Referring to FIG. 3 which is a perspective view showing the essential portions of an embodiment of the present invention, reference numerals 11 and 12 designate a pair of annular members, reference numeral 13 denotes a post for axially connecting the annular members, and reference numeral 14 designates a pocket containing a roller and formed by the adjacent post and the annular members 11 and 12.

The post has a pair of spaced apart holding portions 133 for holding the roller at two locations and preventing the roller from falling off the pocket. The holding portions each have a cylindrical surface facing the interior of the pocket, and lip portions 136 and 137 are formed on the outer peripheral portion and the inner peripheral portion of a retainer extending radially from the cylindrical surface. Further, a recess 132 which provides a reservoir for lubricant is provided between the holding portions, and a planar portion 131 which also provides a reservoir for lubricant is provided between the flat inner end surfaces 111, 121 of the annular members which are adjacent to the pocket and the holding portions.

A connecting portion 15 which connects the planar portion 131 to the inner end surfaces 111 and 121 facing the pocket side of the annular members has a curved surface concave toward the pocket, i.e., a curved surface having its center of curvature in the pocket, and the radius of curvature R of this curved surface becomes gradually greater toward the outer periphery side and the inner peripheral portion of the retainer in a range in which it does not interfere with the chamfered portion of the roller, relative to the pitch circle l when the roller is contained in the pocket.

That is, the curved surface of the connecting portion 15 assumes the minimum radius of curvature at the pitch circle l and assumes the maximum radius of curvature at the outer peripheral portion or the inner peripheral portion. As described above, in the retainer of this embodiment, the radius of curvature R of the corner of the connecting portion 15 which connects the post to the annular members becomes minimum on the pitch circle l and becomes gradually greater toward the outer periphery side and the inner periphery side of the retainer and therefore, even if severe vibratory shock is imparted, concentration of stress is small because the radii of curvature of the inner peripheral portion and the outer peripheral portion of the retainer are great and thus, the retainer is of a high breaking strength.

Also, the breaking strength of the connecting portion is increased and therefore, it becomes possible to decrease the axial thickness of the annular members and even if the width of the retainer is limited by the width of the bearing, the length of the roller can be made as great as possible and therefore, a bearing of great load capacity can be provided.

Figure 4:
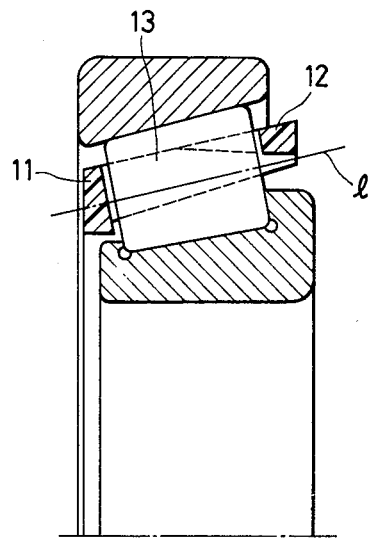
FIGS. 4 and 5 show another embodiment of the present invention, FIG. 4 corresponding to FIG. 1 and FIG. 5 corresponding to FIG. 2.
Figure 5:
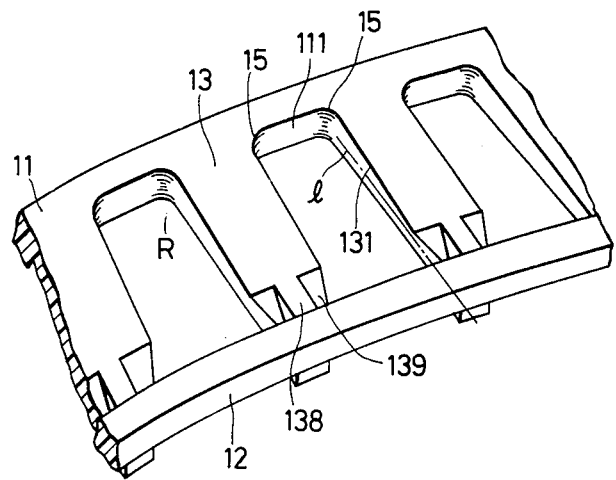

FIGS. 4 and 5 show another embodiment of the present invention. This embodiment utilizes a plastic retainer for a conical roller bearing.

Reference numeral 11 designates an annular member of small diameter, reference numeral 12 denotes an annular member of large diameter, reference numeral 13 designates a post which axially connects the annular members, and reference numeral 14 denotes a pocket formed by the adjacent post and the annular members.

The retainer of this embodiment is of the rapping (generally called the axial draw) type, and a rib 138 for reinforcing the connection between the post and the annular member of large diameter is formed on a portion connected to the annular member 12 on the outer periphery of the post, and the retainer has an escape portion 139 for rapping adjacent to the rib 138. The side surface of the post which faces the pocket for containing the roller is formed flatly. The corner of the connecting portion which connects the annular member 11 of small diameter to the post 13 assumes maximum corner R dimensions at the pitch circle 1 of the roller and becomes gradually greater toward the outer periphery side and the inner periphery side of the retainer in a range in which it does not interfere with the chamfered portion of the roller.

This embodiment, namely, the plastic retainer for conical roller bearing, is molded by the axial draw system and therefore, both of the annular member 11 of small diameter and the annular member 12 of large diameter are often small in the radial thickness and the axial thickness and particularly, it is necessary to enhance the fatigue breaking strength of the retainer, and the effect that this countermeasure can be carried out within the pocket is great.

In the above-described embodiment, the radius of curvature of the corner is minimum in the pitch circle of the roller and becomes gradually greater toward the outer periphery side and the inner periphery side of the retainer, whereas the shape of the curved surface of this corner is not restricted to the embodiment, but may be greater not gradually but stagewisely if said radius of curvature is set so that it is minimum in the pitch circle of the roller and maximum on the outer periphery side or the inner periphery side of the retainer.

As described above, the plastic retainer for roller bearing of the present invention is formed so that it is minimum on the pitch circle of the roller of the radius of curvature of the corner of the connecting portion which connects the planar portion formed on the side surface of the post to the inner end surface of the annular member and becomes greater toward the outer peripheral portion and the inner peripheral portion of the retainer and therefore, the radius of curvature is maximum in said outer peripheral portion or said inner peripheral portion and as a result, the concentration of stress can be made smaller while, at the same time, the thickness in the direction in which crack is propagated is increased, and this leads to an improved breaking strength of the retainer. Further, coupled with the improved breaking strength, the thickness of the annular member can be made smaller and therefore, the roller longer by that amount can be contained, and this leads to the effect that the load capacity of the bearing is improved.

Conversely, in a usage wherein the load capacity need not be improved, it is also possible to decrease the axial thickness of the annular member and as a result, the width of the retainer becomes compact and therefore, the widthwise dimension of the bearing can be reduced and the mounting space can be economized.

I claim:

1. A plastic retainer for roller bearing comprising first and second annular members disposed in axially spaced apart relationship, a plurality of posts connecting said annular members and disposed circumferentially equidistantly, and a pocket for containing a roller formed between two adjacent posts and said annular members, characterized in that the side surface of the post forming said pocket which is adjacent to said first annular member has a planar portion, the connecting portion between said planar portion and said first annular member provides a curved surface concave toward said pocket, and the raidus of curvature of said curved surface is minimum on the pitch circle of the roller and is greater toward at least one side of the radial direction of said retainer.

2. A plastic retainer according to claim 1, further characterized in that the second annular member on the side surface of the posts forming said pocket has a second planar portion, the connecting portion between said second planar portion and said second annular member provides a second curved surface portion concave toward said pocket, and the radius of curvature of said second curved surface portion is minimum on the pitch circle of the roller and is greater toward at least one side of the radial direction of said retainer.

3. A plastic retainer according to claim 2, further characterized in that each of said posts has a pair of spaced enlarged portions having a cylindrical surface portion facing the interior of said pocket, and a reservoir for lubricant is formed between said portions.

4. A plastic retainer accoridng to claim 1, further characterized in that said retainer is a plastic retainer for cylindrical roller bearing.

5. A plastic retainer according to claim 1, further characterized in that said first annular member has a diameter smaller than that of said second annular member.

6. A plastic retainer according to claim 5, further characterized in that said retainer is a plastic retainer for conical roller bearing.

7. A plastic retainer for roller bearing comprising first and second annular members disposed in axially spaced apart relationship, a plurality of posts connecting said annular members and disposed circumferentially equidistantly, and a pocket for containing a roller formed between two adjacent posts and said annular members, characterized in that the side surface of the post forming said pocket which is adjacent to said first annular member has a planar portion, the connecting portion between said planar portion and said annular members is connected by a curved surface having its center of curvature in said pocket, and the radius of curvature of said curved surface is minimum on the pitch circle of the roller and is greater toward at least one side of the radial direction of said retainer.

* * * * *